(12) United States Patent
Ito et al.

(10) Patent No.: US 11,236,780 B2
(45) Date of Patent: Feb. 1, 2022

(54) SLIDING MEMBER

(71) Applicant: DAIDO METAL COMPANY LTD., Nagoya (JP)

(72) Inventors: Yoshifumi Ito, Inuyama (JP); Yu Suzuki, Inuyama (JP); Takayoshi Yamauchi, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 0 days.

(21) Appl. No.: 17/086,816

(22) Filed: Nov. 2, 2020

(65) Prior Publication Data
US 2021/0140475 A1     May 13, 2021

(30) Foreign Application Priority Data
Nov. 7, 2019    (JP) .............................. JP2019-202228

(51) Int. Cl.
*F16C 17/02*  (2006.01)
*F16C 33/12*  (2006.01)
*F16C 33/20*  (2006.01)

(52) U.S. Cl.
CPC .......... *F16C 33/201* (2013.01); *F16C 17/022* (2013.01); *F16C 33/122* (2013.01); *F16C 33/206* (2013.01); *F16C 2208/02* (2013.01); *F16C 2208/32* (2013.01); *F16C 2208/86* (2013.01)

(58) Field of Classification Search
CPC ...... F16C 17/022; F16C 33/122; F16C 33/16; F16C 33/201; F16C 33/205; F16C 33/24; F16C 2208/02; F16C 2208/32; F16C 2208/36; F16C 2208/40; F16C 2208/44; F16C 2208/52; F16C 2208/60; F16C 2208/66; F16C 2208/78; F61C 2202/52
USPC ........... 384/26, 116, 95, 300, 908, 922, 912; 524/495; 254/511
See application file for complete search history.

(56) References Cited

U.S. PATENT DOCUMENTS

| 4,582,368 | A | * | 4/1986 | Fujita | .................... F16C 33/201 384/13 |
| 4,623,590 | A | * | 11/1986 | Hodes | ...................... C08K 7/02 428/408 |
| 9,296,175 | B2 | * | 3/2016 | Yamaguchi | ............. B32B 5/145 |

(Continued)

FOREIGN PATENT DOCUMENTS

| CN | 101809092 A | * | 8/2010 | ............. B82Y 30/00 |
| DE | 10259380 A1 | * | 7/2003 | ............... C08K 7/06 |

(Continued)

*Primary Examiner* — Marcus Charles
(74) *Attorney, Agent, or Firm* — Snyder, Clark, Lesch & Chung, LLP

(57) ABSTRACT

A sliding member includes a back-metal layer and a sliding layer on the back-metal layer, and the sliding layer has a sliding surface. The sliding layer includes a synthetic resin and fibrous particles dispersed in the synthetic resin. A volume ratio of the fibrous particles in the sliding layer is 1 to 15%, and the fibrous particles are made of semi-graphite having a nano indenter hardness of 1000 to 5000 MPa. An average aspect ratio of the fibrous particles is not less than 5, where an aspect ratio is defined as a ratio of a major axis to a minor axis of the fibrous particle viewed from the sliding surface. An average grain size of the fibrous particles in cross-sectional view perpendicular to the sliding surface is 5 to 50 μm.

9 Claims, 2 Drawing Sheets

(56) References Cited

U.S. PATENT DOCUMENTS

| | | | | |
|---|---|---|---|---|
| 2004/0213492 | A1* | 10/2004 | Kim | F16C 33/201 |
| | | | | 384/300 |
| 2015/0125101 | A1* | 5/2015 | Kachoosangi | F16C 33/043 |
| | | | | 384/129 |
| 2018/0087574 | A1* | 3/2018 | Yamauchi | F16C 33/201 |
| 2018/0258990 | A1* | 9/2018 | Yamauchi | F16C 33/201 |
| 2019/0301529 | A1* | 10/2019 | Ikegami | F16C 17/02 |

FOREIGN PATENT DOCUMENTS

| | | | | |
|---|---|---|---|---|
| EP | 3715653 A1 * | 9/2020 | | F16C 17/12 |
| FR | 2555504 A2 * | 5/1985 | | C08K 7/02 |
| JP | H10-204282 A | 8/1998 | | |
| JP | 2000145784 A * | 5/2000 | | F16C 33/201 |
| JP | 2001-132756 A | 5/2001 | | |
| JP | 3229020 B2 * | 11/2001 | | F16C 33/201 |
| JP | 2008001955 A * | 1/2008 | | F16C 33/24 |
| JP | 2010-159808 A | 7/2010 | | |
| JP | 2013-194204 A | 9/2013 | | |
| WO | WO-2013191172 A1 * | 12/2013 | | F16C 33/046 |
| WO | WO-2019044864 A1 * | 3/2019 | | F16C 33/208 |

* cited by examiner

SLIDING MEMBER

TECHNICAL FIELD

The present invention relates to a sliding member, and specifically relates to a sliding member including a back-metal layer and a sliding layer made of a synthetic resin.

RELATED ART

A sliding member which includes a back-metal layer made of a metal and a sliding layer made of a resin composition coated on the back-metal layer has been used in a bearing or the like. Such resin composition for the sliding member has been known that incudes carbon fiber particles dispersed in a synthetic resin to improve wear resistance and strength of the sliding layer (see, for example, JP 10-204282A and JP 2013-194204A). The resin composition including carbon fiber particles dispersed in a synthetic resin has been also proposed for a multilayer bearing in which a porous layer is formed on a steel plate or the like and the porous layer is impregnated and coated with a resin composition including a synthetic resin such as PTFE. For example, carbon fibers are dispersed in a synthetic resin for the purpose of improving wear resistance in JP 2001-132756A and for the purpose of improving strength of a resin layer in JP 2010-159808A.

BRIEF SUMMARY OF THE INVENTION

The dispersion of carbon fibers in a synthetic resin has advantages in that high hardness of the carbon fibers improves wear resistance and that a fibrous shape of the carbon fibers improves strength of a sliding layer made of the synthetic resin. However, in some cases, excessively high hardness of the carbon fibers damages a counter shaft. Furthermore, there are following problem. Even when the synthetic resin matrix is worn, the carbon fibers are not worn. Thus, when the synthetic resin matrix is further worn, the carbon fibers protrude from a sliding surface of the sliding layer, and the carbon fibers fall off from the synthetic resin. The carbon fibers that have fallen off from the synthetic resin enter the space between the sliding surface and the counter shaft to accelerate abrasive wear.

Therefore, an object of the present invention is to solve the above problem of the conventional technique and to provide a sliding member in which fibrous particles are appropriately worn, thereby providing a sliding member that includes a sliding layer having higher wear resistance and is less likely to damage a counter shaft.

According to an aspect of the present invention, provided is a sliding member including: a back-metal layer; and a sliding layer on the back-metal layer. A surface of the sliding layer acts as a sliding surface. The sliding layer includes a synthetic resin and fibrous particles dispersed in the synthetic resin. A volume ratio of the fibrous particles in the sliding layer is 1 to 15%, and the fibrous particles include semi-graphite having a nano indenter hardness of 1000 to 5000 MPa. An average aspect ratio of the fibrous particles is not less than 5. An aspect ratio is defined as a ratio of a major axis to a minor axis of the fibrous particle viewed from the sliding surface. An average grain size of the fibrous particles in cross-sectional view perpendicular to the sliding surface is 5 to 50 μm.

According to an embodiment of the present invention, the sliding member preferably has a substantially cylindrical shape or a substantially semi-cylindrical shape.

According to an embodiment of the present invention, the synthetic resin is preferably one or more selected from PTFE (polytetrafluoroethylene), PAI (polyamideimide), PI (polyimide), PBI (polybenzimidazole), PA (polyamide), phenol, epoxy, POM (polyacetal), PEEK (polyether ether ketone), PE (polyethylene), PPS (polyphenylene sulfide), and PEI (polyetherimide).

According to an embodiment of the present invention, the synthetic resin is preferably PTFE.

According to an embodiment of the present invention, the synthetic resin preferably is composed of PTFE, and more than 0 volume % and not more than 40 volume % of one or more selected from PFA, FEP, PVDF, ETFE and PVF.

According to an embodiment of the present invention, the sliding layer preferably further includes 1 to 20 volume % of one or more solid lubricants selected from $MoS_2$, $WS_2$, graphite and h-BN.

According to an embodiment of the present invention, the sliding layer preferably further includes 1 to 10 volume % of one or more fillers selected from $CaF_2$, $CaCo_3$, barium sulfate, iron oxide, calcium phosphate, $SnO_2$ and aromatic polyester.

According to an embodiment of the present invention, the back-metal layer preferably has a porous metal portion on a surface which is an interface between the back-metal layer and the sliding layer.

DETAILED DESCRIPTION OF THE INVENTION

Figure 1:
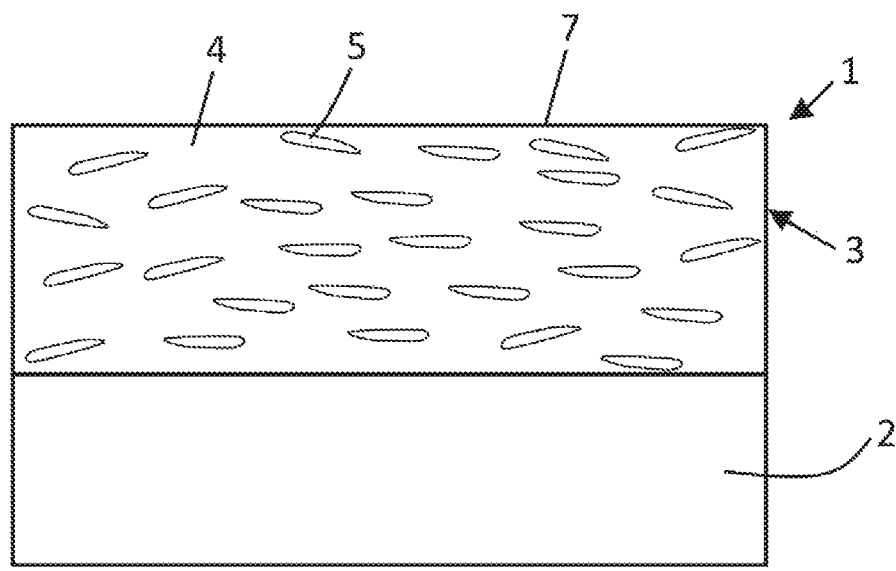
FIG. 1 is a diagram showing a cross section of a sliding member according to an embodiment of the present invention.

FIG. 1 schematically shows a cross section of an embodiment of a sliding member 1 according to the present invention. The sliding member 1 includes a sliding layer 3 on a back-metal layer 2. In the sliding layer 3, fibrous particles 5 are dispersed in a synthetic resin 4. A surface 7 of the sliding layer 3 is a sliding surface 7.

The dispersion of the fibrous particles 5 in the synthetic resin 4 improves strength and load resistance of the sliding layer 3. A volume ratio of the fibrous particles 5 dispersed in the synthetic resin 4 is 1 to 15%. If the volume ratio of the fibrous particles 5 in the synthetic resin 4 is less than 1%, the effect of improving the strength of the sliding layer 3 is insufficient, and if the volume ratio of the fibrous particles 5 in the synthetic resin 4 is more than 15%, friction properties of the synthetic resin layer is deteriorated. When the volume ratio of the fibrous particles 5 in the synthetic resin 4 is 3 to 15%, the effect of the fibrous particles 5 dispersed in the synthetic resin 4 is enhanced, and when the volume ratio of the fibrous particles 5 in the synthetic resin 4 is 5 to 15%, the effect is further enhanced.

The fibrous particles 5 are made of semi-graphite. The semi-graphite is a material that is formed by firing a carbonaceous substance at a temperature of not lower than 1800° C. but lower than 2000° C. The carbonaceous substance is amorphous carbon including carbon atoms by approximately 100%. The semi-graphite maintains a certain degree of hardness of the carbonaceous substance and also has a softness of graphite. The fibrous particles 5 are made of semi-graphite have a nano indenter hardness of 1000 to 5000 MPa.

With regard to wear of the synthetic resin including the fibrous particles 5, since the fibrous particles 5 are harder than the synthetic resin 4, the fibrous particles 5 suppress wear of the synthetic resin 4. If the nano indenter hardness of the fibrous particles 5 is excessively low, such as less than 1000 MPa, the sliding layer 3 is worn quickly and wear resistance of the sliding layer 3 is deteriorated. If the nano indenter hardness of the fibrous particles 5 is excessively high, such as more than 5000 MPa, which is of the same level of conventional carbon fibers, the synthetic resin 4 is first worn during sliding of the sliding member 1 against a counter shaft, and the fibrous particles protrude from the sliding surface to damage the counter shaft. Furthermore, the fibrous particles are not worn (i.e., breakage or partial shear failure) and entirely fall off from the synthetic resin 4, resulting in abrasive wear and acceleration of wear. When the nano indenter hardness of the fibrous particles 5 is 1000 to 5000 MPa, the fibrous particles 5 are worn together with the synthetic resin 4 while the sliding layer 3 maintains the wear resistance, and thus the abrasive wear can be prevented. The nano indenter hardness of the fibrous particles 5 is more preferably 1500 to 5000 MPa, and still more preferably 2000 to 5000 MPa.

An average grain size of the fibrous particles 5 in cross-sectional view perpendicular to the sliding surface 7 is 5 to 50 μm. If the average grain size of the fibrous particles 5 is less than 5 μm, some of the fibrous particles 5 exposed on the sliding surface 7 are more likely to fall off from the sliding surface 7 during sliding of the sliding member 1 against a counter shaft, and the wear resistance of the sliding layer 3 is deteriorated. If the average grain size of the fibrous particles 5 is more than 50 μm, a surface of the counter shaft is more likely to be damaged.

An average aspect ratio of the fibrous particles 5 viewed in the sliding surface 7 is not less than 5. When the average aspect ratio is not less than 5, the wear resistance is further improved than when the average aspect ratio is less than 5. It is presumed because a larger surface area of the fibrous particles 5 increases a contact area between the synthetic resin 4 and the fibrous particles 5 and improves adhesion therebetween. Thus, the fibrous particles 5 are less likely to fall off from the sliding surface 7 during sliding of the sliding member 1 against a counter shaft.

The sliding member 1 having the above configuration is less likely to damage the counter shaft while it has sufficient strength and the wear resistance.

A kind of the synthetic resin 4 is not particularly limited. The synthetic resin 4 may be one or more selected from PTFE (polytetrafluoroethylene), PAI (polyamideimide), PI (polyimide), PBI (polybenzimidazole), PA (polyamide), phenol, epoxy, POM (polyacetal), PEEK (polyether ether ketone), PE (polyethylene), PPS (polyphenylene sulfide) and PEI (polyetherimide).

In particular, the synthetic resin 4 is preferably PTFE. PTFE has low friction properties and high sliding properties. Alternatively, the synthetic resin 4 may include PTFE as a main component and further include more than 0 volume % and not more than 40 volume % of one or more molten fluororesins selected from PFA (perfluoroalkoxyalkane polymer), FEP (perfluoroethylenepropene copolymer), PVDF (polyvinylidene fluoride), ETFE (ethylene-tetrafluoroethylene copolymer) and PVF (polyvinyl fluoride). The addition of the molten fluororesin can contribute to improvement of the wear resistance.

The sliding layer 3 may optionally further include 1 to 20 volume % of one or more solid lubricants selected from $MoS_2$, $WS_2$, graphite and h-BN. When the sliding layer includes the solid lubricant, the sliding layer can have higher sliding properties.

The sliding layer 3 may optionally include 1 to 10 volume % of one or more fillers selected from $CaF_2$, $CaCo_3$, barium sulfate, iron oxide, calcium phosphate, $SnO_2$ and aromatic polyester. When the sliding layer includes the filler, the sliding layer can have higher wear resistance.

The back-metal layer 2 supports the sliding layer 3 to ensure strength of the sliding member. While a material of the back-metal layer 2 is not particularly limited, the back-metal layer 2 may be a metal plate made of an Fe alloy, Cu, a Cu alloy, Al, an Al alloy, or the like.

Figure 2:
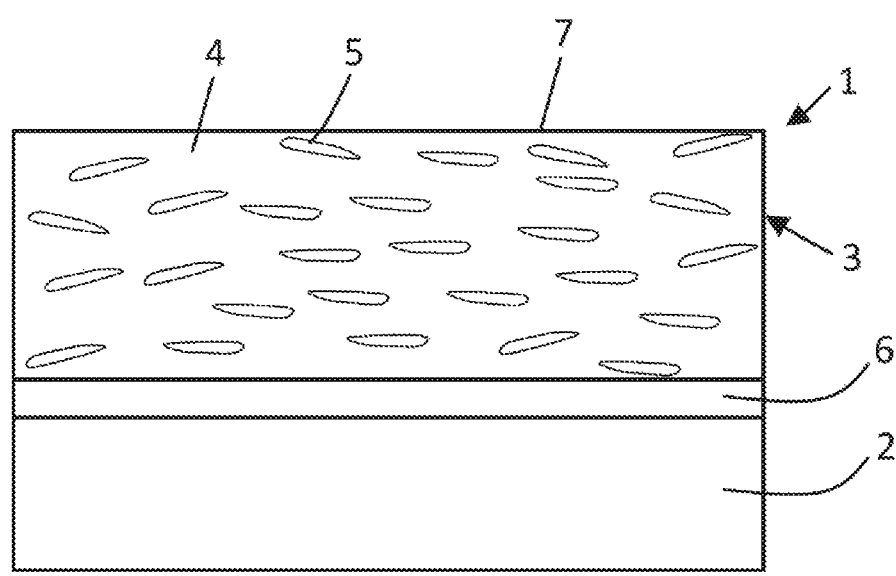
FIG. 2 is a diagram showing a cross section of a sliding member according to another embodiment of the present invention.

FIG. 2 schematically shows a cross section of another embodiment of the sliding member 1 according to the present invention. In this embodiment, the back-metal layer 2 has a porous metal portion 6 on a surface facing the sliding layer 3. Other configurations are same as those of the embodiment in FIG. 1 described above. The porous metal portion 6 on the surface of the back-metal layer 2 can improve bonding strength between the sliding layer 3 and the back-metal layer 2. Since pores of the porous metal portion 6 are impregnated with the composition constituting the sliding layer 3, a bonding force between the back-metal layer 2 and the sliding layer 3 can be enhanced due to an anchor effect.

The porous metal portion 6 can be formed by sintering a metal powder made of Cu, a Cu alloy, Fe, an Fe alloy, or the like on a surface of a metal plate or strip or the like. The porous metal portion 6 may have a porosity of approximately 20 to 60%. The porous metal portion 6 may have a thickness of approximately 0.05 to 0.5 mm. In this case, the sliding layer 3 is impregnated and coated on a surface of the porous metal portion 6 and may have a thickness of approximately 0.05 to 0.4 mm. Note that the dimensions described above are merely an example. The present invention is not limited to the above values, and the dimensions may be changed to other dimensions.

The sliding member may have a substantially cylindrical shape or a substantially semi-cylindrical shape. In this case, the sliding layer 3 is located on an inner side of the sliding member and the back-metal layer 2 is located on an outer side of the sliding member. The sliding surface 7 is an inner surface of the sliding member. The substantially cylindrical shape does not need to be a cylindrical shape with a strictly circular cross section. In addition, the substantially cylindrical shape may have, for example, a groove or a hole, or may have a flange at an axial end portion. The substantially semi-cylindrical shape does not need to be a cylindrical shape with a strictly semicircular cross section. The substantially semi-cylindrical shape may have, for example, a groove or a hole in an axial direction or the like, or may have a flange at an axial end portion.

Next, measurement methods are described.

Method of measuring an average grain size of fibrous particles

The average grain size of the fibrous particles is measured by taking electronic images of a plurality of portions of a substantially cylindrical or substantially semi-cylindrical axial cross section (which is a cross section perpendicular to the axial direction and perpendicular to the sliding surface; the cross section is referred to as merely "cross section perpendicular to the sliding surface") of the sliding member at a magnification of 200 times with use of an electron microscope (described later). The axial direction of the substantially cylindrical shape or the substantially semi-cylindrical shape of the sliding member is arranged to a direction in which the sliding member passes through rolls described in the following manufacturing method. Specifically, the average grain size of the fibrous particles is obtained from the electronic images by measuring an area of each of the fibrous particles with use of a general image analysis method (analysis software: Image-Pro Plus (Version 4.5) manufactured by Planetron, Inc.), calculating a diameter of a circle having an area equal to the area of each of the fibrous particles, and calculating an average diameter (circle equivalent diameter). The magnification of the electronic images is not limited to 200 times, and may be changed to other magnifications.

In a case where the porous metal portion is provided on the surface of the back-metal layer, the surface of the back-metal layer has recessed and protruding portions. In this case, the interface between the sliding layer and the back-metal layer is defined by an imaginary line that is drawn in the image from an apex of the protruding portion located closest to the sliding surface side on the surface of the back-metal layer (porous metal portion) and that extends parallel to the sliding surface. The average grain size of the fibrous particles is calculated between the imaginary line and the sliding surface.

Method of measuring an average aspect ratio of fibrous particles

Figure 3:
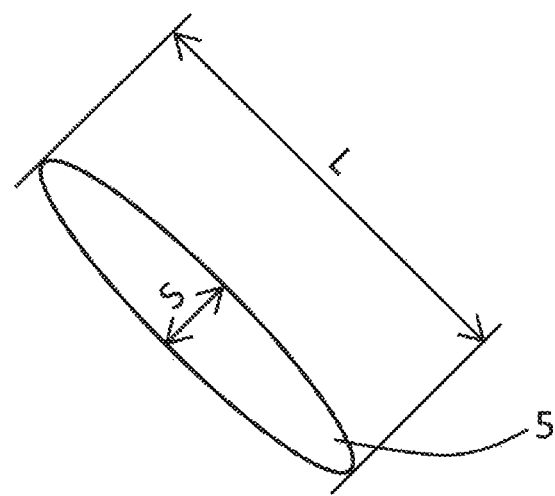
FIG. 3 is a diagram explaining an aspect ratio of a fibrous particle.

The average aspect ratio of the fibrous particles is measured by taking electronic images of the sliding surface of the sliding member at a magnification of 200 times with use of a microscope. Specifically, the average aspect ratio of the fibrous particles is obtained from the images as an average ratio of a major axis length L to a minor axis length S (major axis length L/minor axis length S) of the fibrous particles with use of an analysis software accompanying the microscope (digital microscope VHX-7000: manufactured by Keyence) (see FIG. 3). The major axis length L of the fibrous particle represents a length of the fibrous particle at a position at which the fibrous particle has a maximum length in the images. The minor axis length S of the fibrous particle represents a length of the fibrous particle at a position at which the fibrous particle has a maximum length in a direction orthogonal to a direction of the major axis length L. The magnification of the microscope images is not limited to 200 times, and may be changed to other magnifications.

Method of measuring nano indenter hardness of fibrous particles

The nano indenter hardness (MPa) of the fibrous particles is obtained in the following manner with use of a nano indenter. A test force is set to 1 mN, and time required to reach the test force, holding time, and unloading time are each set to 10 seconds. A regular triangular pyramid Berkovich indenter having a tip end with a diamond tip is used. While the accompanying optical microscope is used to check a position of a fibrous particle in the synthetic resin in the cross section of the sliding layer, the indenter is pushed into a center of the fibrous particle. When the indenter is pushed into the fibrous particle a hardness (MPa) is measured at any 5 portions, and then an average hardness of the 5 portions is calculated.

A manufacturing process of thee above sliding member is described in detail.

(1) Preparation of Raw Material Fibrous Particles

Raw material fibrous particles which are semi-graphite may be obtained, for example, by firing fibers (hard carbon fibers) of hard carbon (non-graphitizable carbon) made of coal tar at a temperature of not lower than 1800° C. and lower than 2000° C. so that a graphitization degree is 70 to 80%. Most of products generally called carbon fibers have a nano indenter hardness of more than 5000 MPa, and thus can not be used for the present invention. Most of products generally called graphite have a nano indenter hardness of less than 500 MPa and have significantly insufficient wear resistance, and thus can not be used for the present invention. The raw material fibrous particles are not limited to the above material. For example, the raw material fibrous particles may be produced at different heat treatment time. The produce raw material fibrous particles having an average grain size (equivalent circle diameter) of 150 to 350 μm were used.

(2) Preparation of Synthetic Resin Particles

Synthetic resin particles as a raw material preferably has an average grain size of 50 to 500% of the average grain size of the fibrous particles. As described above, the synthetic resin may be one or more selected from PTFE, PAI, PI, PBI, PA, phenol, epoxy, POM, PEEK, PE, PPS, and PEI. In particular, the synthetic resin is preferably PTFE. Alternatively, the synthetic resin may be composed of PTFE, and more than 0 volume % and not more than 40 volume % of one or more molten fluororesins selected from PFA, FEP, PVDF, ETFE, and PVF.

(3) Mixing

The synthetic resin particles, the fibrous particles, the solid lubricant and the filler are stirred and mixed at a predetermined ratio to obtain a mixture. Then, 10 to 25 wt % of organic solvent is added to 100 wt % of mixture, and further stirred and mixed. The method of mixing the synthetic resin, the fibrous particles, the solid lubricant and the filler is not limited to the stirring and mixing method and, for example, the mixture may be prepared under a different mixing condition such as melt-kneading by heating (see Example 9).

(4) Back-Metal Layer

The back-metal layer may be a metal plate made of an Fe alloy, Cu, a Cu alloy, Al, an Al alloy, or the like. In a case where the back-metal layer has the porous metal portion, the porous metal portion may have the same composition as the back-metal layer. Alternatively, the porous metal portion may have different composition or made of a different material from the back-metal layer.

(5) Coating Step

The mixed resin composition is coated on the back-metal layer. As the coating method, the resin composition is placed on one surface of the back-metal layer or the porous metal portion on the back-metal layer and passed through a space between rolls having a predetermined constant gap.

(6) Drying and Firing Step

The back-metal layer coated with the composition is subjected to heating for drying the organic solvent in the composition and heating for firing the resin in the composition to obtain a sliding member. Conditions for the heating may be generally used conditions for the used resin.

The sliding member obtained in the above process is subsequently processed into a desired product shape. For example, in the case of a substantially cylindrical or substantially semi-cylindrical bearing, sizing is performed by passing the sliding member through a space between rolls having a predetermined constant gap so that the sliding member has a predetermined size. Then, the sliding member is formed into a cylindrical shape so that the resin composition of the sliding member is located on an inner side. At that time, the sliding member is formed so that a direction in which the sliding member passes through the space between the rolls is approximately a circumferential direction of the substantially cylindrical shape or the substantially semi-cylindrical shape.

EXAMPLES

Examples 1 to 9 of the sliding member including the back-metal layer and the sliding layer according to the present invention and Comparative Examples 10 to 17 were produced in the following manner. Table 1 shows composition of the sliding layer of the sliding members of Examples 1 to 9 and Comparative Examples 10 to 17. In Table 1, a column "Synthetic resin" shows a volume ratio of PTFE, PEEK and PVF in the synthetic resin, and a column "Additives" shows a volume ratio of each additive in the entire sliding layer.

the raw material fibrous particles of Examples 1 to 9 and Comparative Examples 10 to 14 had a nano indenter hardness of 1000 to 5000 MPa, the raw material fibrous particles of Comparative Example 15 had a nano indenter hardness of 500 MPa, and the raw material fibrous particles of Comparative Example 16 had a nano indenter hardness of 10000 MPa. In Comparative Example 17, the raw material spherical graphite particles had a nano indenter hardness of 100 MPa. When the particles were dispersed in the sliding layer and then hardness of each of the particles in a cross section of the sliding layer was measured with use of a nano indenter, the hardness was same as that of the raw material.

A raw material of the synthetic resin of Examples 1 to 4 and Comparative Example 10 was PTFE particles, and, and a raw material of the synthetic resin of Examples 5 to 8 and Comparative Examples 11 to 17 was PTFE particles and PVF particles. An average grain size of these particles was 125% of the average grain size of the raw material fibrous particles. In Example 9, a raw material of the synthetic resin

TABLE 1

|  |  | Sliding layer composition (volume %) |  |  |  |  |  |  |  | Measured values of fibrous particles |  |  |  |  |
|---|---|---|---|---|---|---|---|---|---|---|---|---|---|---|
|  |  | Synthetic resin* |  |  | Additives** |  |  |  |  |  | Nano Indenter |  | Average | Evaluation |  |
|  |  |  |  |  | Semi-Graphite Fibrous particles | Carbon Fiber particles | Spherical Graphite particles | Solid lubricant |  | Filler | Hardness | Average Aspect ratio | Grain Size | Presence of damage to shaft | Amount of wear |
|  |  | PTFE | PEEK | PVF |  |  |  | $MoS_2$ | $WS_2$ | $CaCO_3$ | (MPa) |  | (μm) |  | (μm) |
| Examples | 1 | 100 | — | — | 1 | — | — | — | — | — | 1000 | 5 | 25 | Not present | 11.9 |
|  | 2 | 99 | — | — | 3 | — | — | — | — | — | 1500 | 15 | 50 | Not present | 11.1 |
|  | 3 | 100 | — | — | 5 | — | — | — | — | — | 2000 | 20 | 25 | Not present | 7.4 |
|  | 4 | 100 | — | — | 10 | — | — | — | — | — | 2500 | 20 | 5 | Not present | 6.1 |
|  | 5 | 60 | — | 40 | 10 | — | — | — | — | — | 3000 | 25 | 10 | Not present | 5.2 |
|  | 6 | 99.9 | — | 0.1 | 15 | — | — | 20 | — | — | 5000 | 25 | 25 | Not present | 2.8 |
|  | 7 | 80 | — | 20 | 15 | — | — | — | 5 | 5 | 5000 | 30 | 25 | Not present | 2.2 |
|  | 8 | 85 | — | 15 | 15 | — | — | 5 | 5 | 10 | 5000 | 20 | 25 | Not present | 1.8 |
|  | 9 | — | 100 | — | 5 | — | — | — | — | — | 1000 | 15 | 30 | Not present | 10 |
| Comparative Examples | 10 | 100 | — | — | 1 | — | — | — | — | — | 1500 | 3 | 50 | Not present | 38.3 |
|  | 11 | 75.5 | — | 24.5 | 0.5 | — | — | — | — | — | 1500 | 15 | 25 | Not present | 65.1 |
|  | 12 | 94 | — | 6 | 20 | — | — | — | — | — | 1500 | 20 | 25 | Not present | 60 |
|  | 13 | 84 | — | 16 | 5 | — | — | — | — | — | 1500 | 20 | 3 | Not present | 58 |
|  | 14 | 89 | — | 11 | 5 | — | — | — | — | — | 1500 | 15 | 70 | Present | 12 |
|  | 15 | 84 | — | 16 | 5 | — | — | — | — | — | 500 | 15 | 25 | Not present | 55 |
|  | 16 | 89 | — | 11 | — | 5 | — | — | — | — | 10000 | 20 | 25 | Present | 43 |
|  | 17 | 95 | — | 5 | — | — | 5 | — | — | — | (100) | (5) | (30) | Not present | 88 |

*Composition (volume ratio) in the synthetic resin
**Volume ratio of the additive in the sliding layer Numerical values in parentheses for Comparative Example 17 are measured values of spherical graphite particles.

With regard to raw material fibrous particles dispersed in the sliding layer of the sliding member shown in Table 1, the raw material fibrous particles of Examples 1 to 9 and Comparative Examples 10 to 12, 15, and 16 had an average grain size of approximately 200 μm, the raw material fibrous particles of Comparative Example 13 had an average grain size of approximately 30 μm. The raw material fibrous particles of Comparative Example 14 had an average grain size of approximately 300 μm. In Comparative Example 17, the sliding layer of the sliding member was made of raw material spherical graphite particles, instead of the fibrous particles, having an average grain size of approximately 50 μm.

With regard to the raw material fibrous particles dispersed in the sliding layer of the sliding member shown in Table 1, was PEEK particles. An average grain size of these particles was 150% of the average grain size of the raw material fibrous particles.

In Examples 6 and 8, an average grain size of raw material particles of an added solid lubricant ($MoS_2$, $WS_2$) was 30% of the average grain size of the raw material fibrous particles. In Examples 7 and 8, an average grain size of raw material particles of an added filler ($CaCO_3$) was 25% of the average grain size of the raw material fibrous particles.

The above raw materials (except for Example 9) were stirred and mixed at composition ratios shown in Table 1 to produce resin compositions. In Example 9, the raw materials were melt-kneaded at a composition ratio shown in Table 1 to produce a resin composition sheet.

Next, the resin composition after stirring and mixing was coated on one surface of the back-metal layer made of an Fe alloy, and then processed with use of rolls so that the composition had a predetermined thickness. In Examples 1 to 4 and Comparative Examples 10 to 12, the back-metal layer was made of a Cu alloy, and in Examples 5 to 9 and Comparative Examples 13 to 17, the back-metal layer was made of an Fe alloy having a surface on which a porous sintered portion made of a Cu alloy was provided.

Next, the back-metal layer coated with the composition was subjected to heat treatment for drying the organic solvent in the composition and heat treatment for firing the synthetic resin in the composition to produce a sliding member. In the produced sliding members of Examples 1 to 8 and Comparative Examples 10 to 15, the sliding layer had a thickness of 0.10 mm, and the back-metal layer had a thickness of 1.9 mm. In the sliding member of Example 9, the sliding layer had a thickness of 0.25 mm, and the back-metal layer had a thickness of 1.75 mm.

In the produced sliding members of Examples 1 to 9 and Comparative Examples 10 to 17, an average grain size and an average aspect ratio of the fibrous particles or the spherical graphite particles dispersed in the sliding layer were measured by the measurement method described above, and a column "Average grain size" and a column "Average aspect ratio" in Table 1 show the results. A nano indenter hardness of the fibrous particles or the spherical graphite particles was measured by the method described above, and a column "Nano indenter hardness" in Table 1 shows the results.

The sliding members of Examples and Comparative Examples were formed into a cylindrical shape so that the sliding layer was located on an inner side, and the sliding members were subjected to a sliding test under conditions shown in Table 2. A column "Amount of wear" in Table 1 shows an amount of wear of the sliding layer after the sliding test for Examples and Comparative Examples. In addition, for Examples and Comparative Examples, a plurality of portions on a surface of a counter shaft after the sliding test were evaluated for the presence of damage to the surface with use of a roughness measuring device. In a column "Presence of damage to shaft" in Table 1, "Present" indicates that a sign of damage with a depth of not less than 5 μm was observed on the surface of the counter shaft, and "Not present" indicates that no such damage was observed.

TABLE 2

| Tester | Bearing tester |
|---|---|
| Load | 25 MPa |
| Sliding speed | 0 ⇔ 4.2 m/s |
| Operation mode | Activated for 5 seconds → Deactivated for 1 second |
| Test time | 180 minutes |
| Bearing dimension | Outer diameter: 29 mm × Inner diameter: 25 mm × Width: 15 mm |
| Bearing gap | 30 μm |
| Oil | SAE10 |
| Oil temperature | 120° C. |
| Counter shaft | SCM420H |
| Counter shaft roughness | 0.2Ra |

As shown in the results in Table 1, the amount of wear of the sliding layer in Examples 1 to 9 after the sliding test was smaller than that in Comparative Examples 10 to 17. Furthermore, no damage was observed on the surface of the counter shaft of Examples 1 to 9 after the sliding test.

In Comparative Example 10, it is presumed that since the average aspect ratio of the fibrous particles was 3, which was excessively low, the fibrous particles fell off from the sliding surface, resulting in a large amount of wear.

In Comparative Example 11, it is presumed that since the volume ratio of the fibrous particles in the sliding layer was 0.5%, which was excessively low, the fibrous particles had an insufficient wear resistance effect, resulting in a large amount of wear of the sliding layer. On the other hand, in Comparative Example 12, it is presumed that since the volume ratio of the fibrous particles in the sliding layer was 20%, which was excessively high, friction of the sliding layer was increased, and, heat was generated during sliding of the sliding member against the counter shaft, resulting in a large amount of wear of the sliding layer.

In Comparative Example 13, it is presumed that since the fibrous particles had an average grain size of 3 μm, which was excessively small, the fibrous particles fell off from the sliding surface, resulting in a large amount of wear. In Comparative Example 14, it is presumed that since the fibrous particles had an average grain size of 70 μm, which was excessively large, deep damage was caused to the surface of the counter shaft.

In Comparative Example 15, it is presumed that since the fibrous particles had a nano indenter hardness of 500 MPa, which was low, no wear resistance effect was obtained, resulting in a large amount of wear. In Comparative Example 16, it is presumed that since the carbon fibers were used, the fibrous particles had a nano indenter hardness of 10000 MPa, which was high, and thus the fibrous particles are not partially worn or sheared, the fibrous particles entirely fell off from the sliding surface and caused acceleration of wear, resulting in a large amount of wear, and furthermore, the fibrous particles that had fallen off from the sliding surface entered between the sliding surface and the counter shaft, resulting in deep damage to the surface of the counter shaft.

In Comparative Example 17, since the spherical graphite particles were used, the particles had a nano indenter hardness of 100 MPa, which was very low, and due to the spherical grain shape, the effect of improving strength of the sliding layer was insufficient. Thus, no wear resistance effect was obtained at all, resulting in a large amount of wear.

The invention claimed is:

1. A sliding member, comprising:
   a back-metal layer; and
   a sliding layer on the back-metal layer, the sliding layer having a sliding surface,
   wherein the sliding layer comprises a synthetic resin and fibrous particles dispersed in the synthetic resin, and a volume ratio of the fibrous particles in the sliding layer is 1 to 15%,
   wherein the fibrous particles are made of semi-graphite having a nano indenter hardness of 1000 to 5000 MPa,
   wherein an average aspect ratio of the fibrous particles is not less than 5, where an aspect ratio is defined as a ratio of a major axis to a minor axis of the fibrous particle viewed from the sliding surface, and
   wherein an average grain size of the fibrous particles in cross-sectional view perpendicular to the sliding surface is 5 to 50 μm.

2. The sliding member according to claim 1, wherein the sliding member has a substantially cylindrical shape or a substantially semi-cylindrical shape.

3. The sliding member according to claim 1, wherein the synthetic resin is one or more selected from PTFE (polytetrafluoroethylene), PAI (polyamideimide), PI (polyimide), PBI (polybenzimidazole), PA (polyamide), phenol, epoxy, POM (polyacetal), PEEK (polyether ether ketone), PE (polyethylene), PPS (polyphenylene sulfide) and PEI (polyetherimide).

4. The sliding member according to claim 1, wherein the synthetic resin is PTFE.

5. The sliding member according to claim 1, wherein the synthetic resin is composed of PTFE, and more than 0 volume % and not more than 40 volume % of one or more selected from PFA, FEP, PVDF, ETFE and PVF.

6. The sliding member according to claim 1, wherein the sliding layer further includes 1 to 20 volume % of one or more solid lubricants selected from $MoS_2$, $WS_2$, graphite and h-BN.

7. The sliding member according to claim 6, wherein the sliding layer further includes 1 to 10 volume % of one or more fillers selected from $CaF_2$, $CaCo_3$, barium sulfate, iron oxide, calcium phosphate, $SnO_2$ and aromatic polyester.

8. The sliding member according to claim 1, wherein the sliding layer further includes 1 to 10 volume % of one or more fillers selected from $CaF_2$, $CaCo_3$, barium sulfate, iron oxide, calcium phosphate, $SnO_2$ and aromatic polyester.

9. The sliding member according to claim 1, wherein the back-metal layer includes a porous metal portion on a surface which is an interface between the back-metal layer and the sliding layer.

\* \* \* \* \*